United States Patent [19]

Tojima

[11] Patent Number: 5,059,155
[45] Date of Patent: Oct. 22, 1991

[54] FRICTION DEVICE OF DAMPER DISC

[75] Inventor: Hiromi Tojima, Neyagawa, Japan

[73] Assignee: Kabushiki Kaisha Daikin Seisakusho, Osaka, Japan

[21] Appl. No.: 481,278

[22] Filed: Feb. 20, 1990

[30] Foreign Application Priority Data

Feb. 21, 1989 [JP] Japan ................................ 1-19095

[51] Int. Cl.$^5$ .............................................. F16D 3/14
[52] U.S. Cl. .................................... 464/68; 192/106.2
[58] Field of Search ........................... 464/64, 66, 68; 192/106.2

[56] References Cited

U.S. PATENT DOCUMENTS

| | | | |
|---|---|---|---|
| 3,931,876 | 1/1976 | Beeskow et al. | 464/68 X |
| 4,018,320 | 4/1977 | Schrape et al. | 464/68 X |
| 4,036,341 | 7/1977 | Beeskow et al. | 192/106.2 |
| 4,044,874 | 8/1977 | Wörner | 464/68 X |
| 4,533,031 | 8/1985 | Nagano | 464/68 X |
| 4,549,641 | 10/1985 | Ootani et al. | 464/68 X |
| 4,573,562 | 3/1986 | DeLand | 464/68 X |

Primary Examiner—Daniel P. Stodola
Assistant Examiner—William G. Battista, Jr.
Attorney, Agent, or Firm—Armstrong, Nikaido, Marmelstein, Kubovcik & Murray

[57] ABSTRACT

The friction device of damper disc of the invention comprises an output member, an input member, springs for coupling the two, and friction mechanisms disposed between the input member and output member. The friction mechanism comprises annular input side and output side friction members, and the input side friction member is located between the output member and the output side friction member. At the edges of the both friction members, pawls extending in the axial direction are provided, and the pawls of the input side friction member are engaged with the notches provided in the input member to coupled the input side friction member and the input member in a manner unable to rotate relatively, and the pawls of the output side friction member are engaged with the notches in the output member couple the output side friction member and output member in a manner unable to rotate relatively, and sliding friction planes are formed between the output member and input side friction member, and the output side friction member and input member, respectively.

1 Claim, 1 Drawing Sheet

FRICTION DEVICE OF DAMPER DISC

BACKGROUND OF THE INVENTION

1. Field of the Invention

The present invention relates to a damper disc for use as a clutch disk of friction clutch for an automobile or the like, and more particularly to a friction device used in such damper disc.

2. Description of the Prior Art

As is known well, in this type of damper disc, a friction mechanism composed of friction washers, friction plates or the like are incorporated. Such friction mechanism is intended to generate friction when the side plate, as the input member, of the damper disc and the flange, as the output member, are deflected relatively to a transmitted torque. Vibration of the transmitted torque is absorbed by such friction.

In the conventional damper disc, the number of sliding friction planes provided in the friction mechanism is limited. More specifically, in a structure disposing a pair of side plates at both sides of the hub flange, a pair of mutually abutting planes slide relatively between each side plate and hub flange. Therefore, the frictional force of the sliding surface is relatively small. Sufficient torque vibration absorbing effect may not be achieved depending on the application or condition or use of the damper disc.

In this regard, the Japanese Laid-open Patent No. 55-97542 discloses a structure in which plural friction members are coupled respectively, to the input member and output member. These friction members are alternately disposed so that the sliding friction planes are set in a large number. In this structure, a relatively large frictional force may be generated but, because the friction mechanism is disposed parallel outside of the disc main body in the axial direction, the entire structure is increased in size. In this conventional structure, moreover, a pin is fixed to the spline hub of the output member and is utilized to couple the friction members. This structure is complicated.

This invention is intended to present a structure solving such problems as stated above.

SUMMARY OF THE INVENTION

To achieve the above object, the invention presents a friction device for a damper disc, in which an annular output member, coupling to an output shaft, and an annular input member, having an input portion, are disposed concentrically and opposingly in the axial direction. The output member and input member are coupled in the circumferential direction by means of a spring. A friction mechanism is disposed between the input member and output member and an annular input side friction member and an annular output side friction member are provided in said friction mechanism. The input side friction member is located between the output member and output side friction member. Pawls, extending in the axial direction, are provided at the edge portion of both friction members. The pawl of the input side friction member is engaged with a notch provided in the input member to couple the input side friction member and the input member in a manner not allowing relative rotation. The pawl of the output side friction member is engaged with a notch provided in the output member to couple the output side friction member and the output member in a manner also not allowing relative rotation. Sliding friction planes are formed, respectively, between the output member and input side friction member, and the output side friction member and input member.

The invention is described in further details with reference to an illustrated embodiment.

DESCRIPTION OF THE PREFERRED EMBODIMENT

Figure 1:
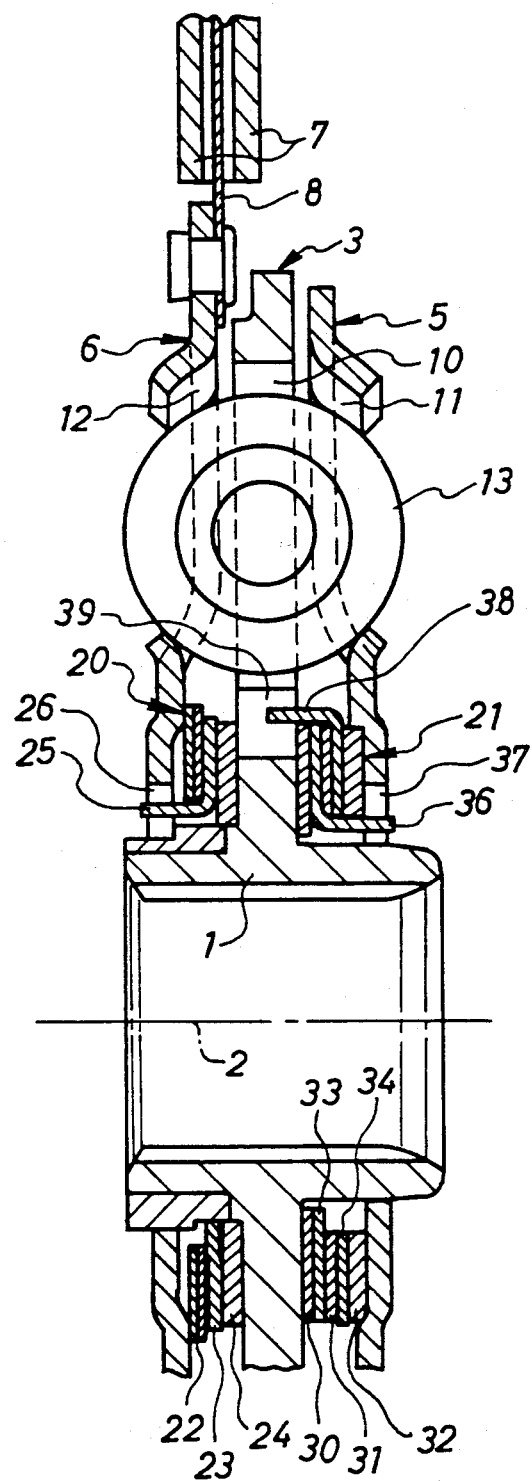
FIG. 1 is a partial sectional view of an embodiment of the invention.

In FIG. 1, a hub 1 is coupled with an output shaft 2 (of which center line only is shown) through internal splines, and on its outer circumference, an annular flange 3 (an output member) is integrally formed. Around the hub 1, a pair of annular side plates 5, 6 are disposed at opposite sides of the flange 3 in the axial direction. On the outer circumference of one side plate 6, cushioning plates 8, lined with friction facings 7 are fixed as, for example by rivets. Plural positions on the outer circumference of the both side plates 5, 6 are integrally coupled by a rivet (not shown) extending in the axial direction. In the flange 3 and side plates 5, 6, openings 10, 11, 12 forming windows are provided at plural positions at spacings in the circumferential direction, respectively, and the flange 3 and side plates 5, 6 are coupled, in the circumferential direction, by springs 13 contained in each such window.

The above structure is already known, in which when the facing 7 is pressed to the flywheel by means of a pressure plate (not shown), torque is transmitted from the flywheel to the side plates 5, 6 by way of the facing 7 and cushioning plates 8, and is further transmitted to the flange through the springs 13. In this torque transmission process, the springs 13 are compressed with a force corresponding to the transmitted torque and, accordingly, the side plates 5, 6 are relatively deflected with respect to the flange 3. By making use of this torsional action, friction is produced by installing friction mechanisms 20, 21 between the inner circumference of the side plates 5, 6 and the flange 3.

The friction mechanism 20 is of a known structure, and is disposed between the side plate 6 and flange 3, and comprises two mutually overlaid conical springs 22, friction plate 23 and friction washer 24. The outer circumference of conical spring 22 is seated on side plate 6'. The side of spring 22 opposite to the side plate 6, through the friction plate 23 pushes the friction washer 24 to the flange 3. Inside the friction plate 23, a pawl 25, of a folding structure is integrally formed on plate 23 and extends in the direction away from the flange 3 The pawl 25 is disposed at plural positions at spacings in the circumferential direction of the friction plate 23, and is engaged with notches 26 disposed in the inner circumference of the side plate 6. By the engagement between the pawls 25 and notches 26, the friction plate 23 is coupled to the side plate and is unable to rotate relative thereto. Therefore, if the side plate 6 is deflected to the flange 3, friction is caused on the surface of the friction washer 24.

The other friction mechanism 21 to which the present invention is more specifically directed is disposed between the inner circumference of the side plate 5 and the flange 3, and comprises three annular friction washers 30, 31, 32, and two annular friction members 33, 34 in an alternately disposed state. The friction member 33 presses the flange 3 through the friction washer 30. Friction member 34 presses the side plate 5 through the friction washer 32. In other words, the friction member 33 is disposed between the flange 3 and the friction member 34, having friction washers 30, 31 disposed at its opposite sides, while the friction member 34 is disposed between the friction member 33 and side plate 5, having friction washers 31, 32 disposed at opposite sides.

The friction member 33 has a pawl 36 of folding structure integrally disposed on its inner circumference. The pawl 36 is disposed at plural positions at spacings in the circumferential direction inside the friction member 33, and extends in the axial direction inside of the radial direction of the friction washers 31, 32 and friction member 34 from the inside of the friction member 33, and is engaged with notches 37 provided inside the side plate 5. Outside the friction member 34, a pawl 38 of folding structure is integrally formed. The pawl 38 is disposed at plural positions at spacings in the circumferential direction outside the friction member 33, extends in the axial direction outside of the radial direction of the friction washers 30, 31 and friction member 33, and is engaged with notches 39 provided in the flanges 3. In the illustrated example, the notches 39 are provided inside the openings 10.

The pawls 36, 38 are engaged with the notches 37, 39 in a manner preventing movement in the circumferential direction thereof. Therefore, the friction member cannot rotate relatively to the side plate 5, and the friction member 34 cannot rotate relatively to the flange 3. The above members of the friction mechanism 21 are mutually contacting by the action of conical spring 22 of the friction mechanism 20.

In this structure, when the side plate 5 rotates relatively to the flange 3, as stated above, the side plate 5 and input friction member 33 rotate on the flange 3 and output friction member 34. Friction is produced on the surface of friction washer (the contacting surface with input friction member. 33, and the contacting surface with flange 3), on the surface of friction washer 31, and on the surface of friction washer 32. Thus, between the flange 3 and side plate 5, frictions are caused at three positions, and the relative rotational angle on individual frictional sliding surfaces is the same as the relative rotational angle of the flange 3 and side plate 5. Therefore, the frictional force caused in the friction mechanism 21 is, for example, three times as large as the friction caused at only one position.

As described herein, according to the invention, as the friction members incorporated into the friction mechanism 21, the input friction member 33 coupled to the input member (input side friction member) and the output friction member 34 coupled to the output member (output side friction member) are combined to cause frictions at both sides of each one of the friction members 33, 34, so that the frictional force as the entire friction mechanism 21 is large. Therefore, the frictional force of the friction mechanism 2!, and the hysteresis torque in the torsional characteristic of the damper disc derived therefrom are large, so that the torque vibration absorbing effect is enhanced.

What is claimed is:

1. The friction device for a damper disc having an output member, with an annular flange and coupled to an output shaft, annular input side plates disposed concentrically and opposingly at the opposite sides of said output flange in the axial direction of said output shaft, said annular output flange and said input side plates being coupled in a circumferential direction of said output shaft by spring means, friction mechanisms disposed between said input side plates and said output flange, one of said friction mechanism disposed between said one of said annular input side plates and said annular output flange comprising a first annular, radially extending friction member having at least one axially extending pawl at its radial inner end extending into a notch at the radial inner end of said one of said side plates and preventing relative rotation between said first friction member and said one of said input side plates, a first friction washer between one annular surface of said first friction member and said annular output flange, a second annular, radially extending friction member having at least one axially extending pawl at its radial outer end and extending into a notch spaced radially outward from the radially inner end of said annular flange, said pawl on said second friction member extending over the radial outer end of said first annular, radially extending friction member and over the radial outer end of said first friction washer and preventing relative rotation between said second friction member and said annular output flange, a second friction washer between one annular surface of said second friction member and said one of said annular input side plates and a third friction washer between another of the annular surfaces of said first friction member and another of the annular surfaces of said second friction member.

* * * * *